United States Patent
Wu et al.

(10) Patent No.: US 10,594,462 B2
(45) Date of Patent: Mar. 17, 2020

(54) STRUCTURED RESOURCE ALLOCATION SIGNALING

(71) Applicant: MEDIATEK INC., Hsinchu (TW)

(72) Inventors: Tianyu Wu, Fremont, CA (US); Jianhan Liu, San Jose, CA (US); Shengquan Hu, Cupertino, CA (US); Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 67 days.

(21) Appl. No.: 15/278,031

(22) Filed: Sep. 28, 2016

(65) Prior Publication Data

US 2017/0093546 A1    Mar. 30, 2017

Related U.S. Application Data (60) Provisional application No. 62/233,627, filed on Sep. 28, 2015, provisional application No. 62/241,904, (Continued)

(51) Int. Cl.
*H04L 5/00* (2006.01)
*H04W 72/04* (2009.01)

(52) U.S. Cl.
CPC .......... *H04L 5/0053* (2013.01); *H04L 5/0023* (2013.01); *H04L 5/0037* (2013.01); (Continued)

(58) Field of Classification Search
CPC ... H04W 72/04; H04B 7/0452; H04B 7/0413; H04L 5/0053
See application file for complete search history.

(56) References Cited

U.S. PATENT DOCUMENTS 7,126,533 B2    10/2006  Fiore et al.
8,213,527 B2    7/2012   Wang et al.
(Continued)

FOREIGN PATENT DOCUMENTS

CN    102149192    8/2011
EP    3098999      11/2016
(Continued)

OTHER PUBLICATIONS

EPO, Search Report for the EP patent application 16191047.6 dated Feb. 14, 2017, 2017 (7 pages).
(Continued)

*Primary Examiner* — Marsha D Banks Harold
*Assistant Examiner* — Elton Williams (57) ABSTRACT

Methods and apparatus are provided for structured resource allocation signaling. In one novel aspect, an 8-bit RU allocation filed is allocated in the HE-SIG-B common field for each 20 MHz. The structured resource signaling supports more than four MU-MIMO users. In one embodiment, the STA decodes the 8-bit RU allocation signal following a structured resource unit (RU) allocation rule, and determines the RU. In one embodiment, the STA decodes the first two bits of the 8-bit RU allocation signal to determine a first category of the RU allocation. The categories of the RU allocation includes a large RU size category indicating larger than or equal to 20 MHz RUs exist, a two 106-tone category indicating two 106-tone RUs exist, and a no-large-RU category indicating only smaller-than-242-tone RUs exist. The STA further decodes based on the category. A lookup table (LUT) for RU allocation is built and decoded based on a structured signaling rule.

19 Claims, 7 Drawing Sheets

Related U.S. Application Data filed on Oct. 15, 2015, provisional application No. 62/244,806, filed on Oct. 22, 2015, provisional application No. 62/245,389, filed on Oct. 23, 2015.

(52) U.S. Cl.
CPC .......... *H04L 5/0046* (2013.01); *H04L 5/0094* (2013.01); *H04W 72/042* (2013.01)

(56) References Cited

U.S. PATENT DOCUMENTS

| | | |
|---|---|---|
| 8,619,641 B2 | 12/2013 | Guo |
| 8,929,192 B2 | 1/2015 | Kainulainen et al. |
| 9,615,214 B2 | 4/2017 | Syrjarinne et al. |
| 9,647,868 B2 | 5/2017 | Jiao et al. |
| 2001/0006540 A1 | 7/2001 | Kim et al. |
| 2006/0158374 A1 | 7/2006 | Rahamin et al. |
| 2008/0191941 A1 | 8/2008 | Saban et al. |
| 2008/0232485 A1 | 9/2008 | Niu et al. |
| 2009/0122890 A1 | 5/2009 | Wu |
| 2010/0246720 A1 | 9/2010 | Wang et al. |
| 2011/0033004 A1 | 2/2011 | Wang et al. |
| 2011/0193739 A1 | 8/2011 | Strauch et al. |
| 2011/0243197 A1 | 10/2011 | Atarashi et al. |
| 2011/0261858 A1 | 10/2011 | Baldemair et al. |
| 2011/0274003 A1 | 11/2011 | Pare, Jr. et al. |
| 2012/0258669 A1 | 10/2012 | Honkanen et al. |
| 2012/0263211 A1 | 10/2012 | Porat et al. |
| 2013/0070701 A1 | 3/2013 | Merlin et al. |
| 2013/0089121 A1 | 4/2013 | Koo et al. |
| 2013/0265907 A1 | 10/2013 | Kim et al. |
| 2013/0321209 A1 | 12/2013 | Kalliola et al. |
| 2013/0343211 A1 | 12/2013 | Liu et al. |
| 2014/0070996 A1 | 3/2014 | Kneckt et al. |
| 2014/0219449 A1 | 8/2014 | Shattil et al. |
| 2014/0254648 A1 | 9/2014 | Van Nee |
| 2014/0328335 A1 | 11/2014 | Zhang |
| 2015/0023449 A1 | 1/2015 | Porat et al. |
| 2015/0124739 A1 | 5/2015 | Baik et al. |
| 2015/0139091 A1 | 5/2015 | Azizi et al. |
| 2015/0139115 A1 | 5/2015 | Seok |
| 2015/0230231 A1 | 8/2015 | Fornoles, Jr. |
| 2015/0296516 A1 | 10/2015 | Jung |
| 2016/0021568 A1 | 1/2016 | Yu et al. |
| 2016/0033614 A1 | 2/2016 | Wang et al. |
| 2016/0047885 A1 | 2/2016 | Wang et al. |
| 2016/0065467 A1 | 3/2016 | Wu et al. |
| 2016/0248542 A1 | 8/2016 | Liu et al. |
| 2016/0249165 A1 | 8/2016 | Aldana |
| 2016/0323060 A1 | 11/2016 | Hassanin et al. |
| 2016/0330055 A1 | 11/2016 | Tong |
| 2016/0352552 A1 | 12/2016 | Liu et al. |
| 2016/0366548 A1 | 12/2016 | Wang et al. |
| 2016/0370450 A1 | 12/2016 | Thorn et al. |
| 2017/0064718 A1* | 3/2017 | Bharadwaj ........ H04W 72/0493 |
| 2017/0070893 A1 | 3/2017 | Wang et al. |
| 2017/0070998 A1 | 3/2017 | Wu et al. |
| 2017/0099089 A1 | 4/2017 | Liu et al. |
| 2017/0104553 A1 | 4/2017 | Liu et al. |
| 2017/0134207 A1 | 5/2017 | Liu et al. |
| 2017/0171363 A1 | 6/2017 | Sun et al. |
| 2017/0171796 A1 | 6/2017 | Wu et al. |
| 2017/0180177 A1 | 6/2017 | Wu et al. |
| 2017/0214507 A1 | 7/2017 | Kang et al. |
| 2017/0215087 A1 | 7/2017 | Amizur et al. |
| 2017/0230220 A1 | 8/2017 | Anwyl et al. |
| 2017/0230981 A1 | 8/2017 | Ryu et al. |
| 2018/0013527 A1 | 1/2018 | Sun et al. |

FOREIGN PATENT DOCUMENTS

| | | |
|---|---|---|
| TW | 201618501 A | 5/2016 |
| WO | 2004049498 | 6/2004 |
| WO | 2010022785 | 3/2010 |
| WO | 2015069811 | 5/2015 |
| WO | 2015077042 | 5/2015 |
| WO | 2016178534 | 11/2016 |
| WO | 2017003229 | 1/2017 |
| WO | 2017027479 | 2/2017 |
| WO | 2017035235 | 3/2017 |

OTHER PUBLICATIONS

Kaushik Josiam et al., HE-SIG-B Contents, doc.: IEEE 802.11-15/1066r0, Sep. 2015, *slide 8* *slides 10,11* *slide 17*.

Robert Stacey, Specification Framework for TGax, IEEE P802.11 Wireless LANs, doc.: IEEE 802.11-15/0132r8, Sep. 2015. *paragraph [3.2.4]*.

Joonsuk Kim et al., HE-SIG-B Structure, doc.: IEEE 802.11-15/0821r2, Sep. 2015. *slide 11-slide 15*.

Darryn Lowe et al., "Analysis and Evaluation of MB-OFDM Dual Carrier Modulation", Telecommunicatins Information Technology Research Institute, University of Wollongong.

EPO, Search Report for the EP Patent Application 15833049.8 dated Feb. 16, 2018 (9 Pages).

International Search Report and Written Opinion of International Search Authority for PCT/CN2015/087365 dated Nov. 24, 2015 (10 Pages).

EPO, Search Report for the EP Patent Application 16187569.5 dated Jan. 23, 2017 (12 Pages).

Young Hoon Kwon, Newracom, SIG Field Design Principle for 11AZ, Doc.: IEEE 802.11-15/0344R2, Mar. 2015 *Slides 5-14*.

EPO, Search Report for the EP Patent Application 16193438.5 dated Mar. 17, 2017 (9 Pages).

EPO, Search Report for the EP Patent Application 16197315.1 dated Mar. 31, 2017 (8 Pages).

Robert Stacey, Intel, Specification Framework for TGAX, IEEE P802.11 Wireless Lans, Jul. 2015 *p. 3, Line 25-39*, * p. 4, Line 1-5*, *Sections 3.2.2, 3.2.3, 3.3.2, 4.1*.

Tim Schmidt, "Clause 6 OFDM PHY Draft", Jan. 2010 IEEE P802.15-10-0013-00-004G, IEEE P802.15 Wireless Personal Area Networks, Progect IEEE P802.15 Working Group for Wireless Personal Area Networks (WPANS).

Katsuo Yunoki, Kddi R&D Laboratories, Considerations on HE-SIG-A/B, Doc.: IEEE 302.11-15/827R2, Jul. 2015 *Slides 2-11*.

Joonsuk Kim, et al., HE-SIG-B Structure, Doc.: IEEE 802.11-15/0821R2, Sep. 2015 *Slides 11-15*.

M. Rahaim et al., Wife PHY Standards Review—From Early 802.11 to 'AC' and 'AD', MCL Technical Report No. Apr. 29, 2014.

EPO, Search Report for The EP Patent Application 16187569.5 dated Nov. 9, 2017(6 Pages).

Kaushik Josiam (Samsung), "HE-SIG-B Contents",11-15-1066-00-00ax-he-sig-b-contents, Sep. 13, 2015.p. 8-17.

K. Yunoki & B. Zhao (KDDI R&D Labs), "Consideration#1:e.g. Expression of HE-SIG-B" , 11-15-0827-02-00ax-considerations-on-he-sig-a-and-b, Jul. 2015.p. 4.

* cited by examiner

| First 2-3 bits | Remaining bits | Description |
|---|---|---|
| 0 0 0 | 0 c c c c | First 2 bits 'c c' indicate the RA of first 10Mhz band, second 2 bits 'c c' indicate the second 10Mhz band. cc'= '00': {26 26 26 26} tone RUs; '01': {26 26 52} tone RUs; '10': {52, 26 26} tone RUs; '11': {52 52} tone RUs. |
| 0 0 0 | 1 r r r r | 4 bits reserved |
| 0 0 1 | c c y y y | 'yyy' = 000~111 indicates number of MU-MIMO STAs on the 106 tone RU (on the second 10Mhz band). |
| 0 1 0 | c c y y y | 'yyy' = 000~111 indicates number of MU-MIMO STAs on the 106 tone RU (on the first 10Mhz band). |
| 0 1 1 | r r r r r | 5 bits reserved |
| 1 0 | y y y y y y | First 3 bit 'yyy' indicates the number of MU-MIMO STAs on the first 106 tone RU and second 3 bit 'yyy' indicates the number of MU-MIMO STAs on the second 106 tone RU. |
| 1 1 | 0 a a y y | 2 bits 'aa' indicates the 4 possible RU size >= 242 tone. 'aa' = '00' : 242 tone RU; '01': 484 tone RU; '10': 996 tone RU; '11': 2x996 tone RU. |
| 1 1 1 | r r r r r | 5 bits reserved |

| 8 bits per 20MHz b7b6b5b4b3b2b1b0 | #1 | #2 | #3 | #4 | #5 | #6 | #7 | #8 | #9 | Num User |
|---|---|---|---|---|---|---|---|---|---|---|
| 000 00000 | 26 | 26 | 26 | 26 | 26 | 26 | 26 | 26 | 26 | 1 |
| 000 00001 | 26 | 26 | 26 | 26 | 26 | 26 | 26 | 52 | | 1 |
| 000 00010 | 26 | 26 | 26 | 26 | 26 | 52 | | 26 | 26 | 1 |
| 000 00011 | 26 | 26 | 26 | 26 | 26 | 52 | | 52 | | 1 |
| 000 00100 | 26 | 26 | 52 | | 26 | 26 | 26 | 26 | 26 | 1 |
| 000 00101 | 26 | 26 | 52 | | 26 | 26 | 26 | 52 | | 1 |
| 000 00110 | 26 | 26 | 52 | | 26 | 52 | | 26 | 26 | 1 |
| 000 00111 | 26 | 26 | 52 | | 26 | 52 | | 52 | | 1 |
| 000 01000 | 52 | | 26 | 26 | 26 | 26 | 26 | 26 | 26 | 1 |
| 000 01001 | 52 | | 26 | 26 | 26 | 26 | 26 | 52 | | 1 |
| 000 01010 | 52 | | 26 | 26 | 26 | 52 | | 26 | 26 | 1 |
| 000 01011 | 52 | | 26 | 26 | 26 | 52 | | 52 | | 1 |
| 000 01100 | 52 | | 52 | | 26 | 26 | 26 | 26 | 26 | 1 |
| 000 01101 | 52 | | 52 | | 26 | 26 | 26 | 52 | | 1 |
| 000 01110 | 52 | | 52 | | 26 | 52 | | 26 | 26 | 1 |
| 000 01111 | 52 | | 52 | | 26 | 52 | | 52 | | 1 |
| 000 1rrrr | Reserved | | | | | | | | | 16 |
| 001 00yyy | 26 | 26 | 26 | 26 | 26 | 106 | | | | 8 |
| 001 01yyy | 26 | 26 | 52 | | 26 | 106 | | | | 8 |
| 001 10yyy | 52 | | 26 | 26 | 26 | 106 | | | | 8 |
| 001 11yyy | 52 | | 52 | | 26 | 106 | | | | 8 |
| 010 00yyy | 106 | | | 26 | 26 | 26 | 26 | 26 | | 8 |
| 010 01yyy | 106 | | | 26 | 26 | 26 | 52 | | | 8 |
| 010 10yyy | 106 | | | 26 | 52 | | 26 | 26 | | 8 |
| 010 11yyy | 106 | | | 26 | 52 | | 52 | | | 8 |
| 011 rrrrr | Reserved | | | | | | | | | 32 |
| 10 yyy yyy | 106 | | | 26 | 106 | | | | | 64 |
| 11 0 00yyy | 242 | | | | | | | | | 8 |
| 11 0 01yyy | 484 | | | | | | | | | 8 |
| 11 0 10yyy | 996 | | | | | | | | | 8 |
| 11 0 11yyy | 2*996 | | | | | | | | | 8 |
| 11 1rrrrr | Reserved | | | | | | | | | 32 |

STRUCTURED RESOURCE ALLOCATION SIGNALING

CROSS REFERENCE TO RELATED APPLICATIONS

This application claims priority under 35 U.S.C. § 119 from U.S. Provisional Application No. 62/233,627, entitled "Structured resource allocation signaling," filed on Sep. 28, 2015, Application No. 62/241,904, entitled "Improvements on structured resource allocation signaling," filed on Oct. 15, 2015, Application No. 62/244,806, entitled "Structured resource allocation signaling," filed on Oct. 22, 2015, Application No. 62/245,389, entitled "Structured resource allocation signaling," filed on Oct. 23, 2015, the subject matter of which is incorporated by reference.

TECHNICAL FIELD

The disclosed embodiments relate generally to wireless network communications, and, HE-SIG-B common field formats and indication.

BACKGROUND

As the demand for wireless communication continues to increase, the world has benefited from the evolution of the IEEE 802.11 wireless networking standard to accommodating more and more users with their ever-increasing data usage. The latest 802.11ax will enable high efficiency (HE) network. It is designed to handle higher data rate and higher user load. The system uses Orthogonal Frequency Division Multiple Access (OFDMA) as well as multi-user multiple-input and multiple-output (MU-MIMO).

Further different operation bandwidth can be supported and configured. The operation bandwidth is partitioned according to a predefined standard. In 11ax, resource allocation (RA) needs to be indicated to support OFDMA and/or MU-MIMO. The resource allocation will be signaled in the common part of the HE-SIG-B field. The resource unit (RU allocation signaling in the common field of HE-SIG-B signal is defined as an 8-bt per 20 Mhz PPDU BW. The RU allocation signaling defines RU arrangements in the frequency domain and number of MU-MIMO allocations for an allocation. How to use this 8-bit RU allocation field efficiently remains a challenge.

SUMMARY

Methods and apparatus are provided for structured resource allocation signaling. In one novel aspect, structured resource signaling is used for the 8-bit RU allocation filed in the HE-SIG-B common field for each 20 MHz. The structured resource signaling supports more than four MU-MIMO users. The structured RU allocation rule supports RU allocation signaling for 20 MHz, 40 MHz, 80 MHz, and 160 Mhz operation BW. In one embodiment, the STA obtains resource allocation (RA) information in an OFDMA wireless network, wherein the RA information is indicated in a HE-SIG-B common field and user specific field, and wherein the HE-SIG-B common field for RA is with a fixed format. The STA decodes an 8-bit RU allocation signal in the HE-SIG-B common field following a structured resource unit (RU) allocation rule, wherein the structured RU allocation rule supports up to 8 users on RUs larger than or equals to 106-tone. The STA determines a RU for the STA based on the decoded 8-bit RU allocation signal and a position of the user specific field for the STA. In one embodiment, the STA decodes the first bits of the 8-bit RU allocation signal to determine a first category of the RU allocation. The categories of the RU allocation includes a large RU size category indicating larger than or equal to 20 MHz RUs exist, a two 106-tone category indicating two 106-tone RUs exist, and a no-large-RU category indicating only smaller-than-242-tone RUs exist and at most one 106-tone RU exists. In one embodiment, the category is the large size RU, and two bits are encoded to indicate the RU size and three bits are encoded to indicate the number of STAs. In another embodiment, the two 106-tone exist category, and wherein a first 3-bit represents the number of STAs on a first 106-tone RU, and a second 3-bit represents the number of STAs on a second 106-tone RU. In yet another embodiment, the category is the no-large-RU category, and wherein a second bit represents whether a 106-tone RU exists on a first half of 20 MHz channel and a third bit represents whether a 106-tone RU exists on a second half of 20 MHz channel.

In another novel aspect, a lookup table (LUT) for RU allocation is built and decoded based on a structured signaling rule. The STA determines the operation bandwidth based on the LUT, or a combination of the LUT and the predefined rule.

In yet another novel aspect, a network entity encodes the 8-bit RU allocation signaling filed with structured resource allocation rule. In one embodiment, the network entity configures a resource allocation (RA) for one or more stations (STAs) in an OFDMA wireless network, wherein the RA information is indicated in a HE-SIG-B common field and user specific field, and wherein the HE-SIG-B common field for RA is with a fixed format. The network entity encodes the 8-bit RU allocation signal in the HE-SIG-B common field following a structured resource unit (RU) allocation rule for each 20 MHz resource block, wherein the structured RU allocation rule supports more than four users on a 106-tone or larger RU using the 8-bit structured RU allocation signaling. The network entity transmits the 8-bit RU allocation signal to one or more STAs. In one embodiment, the network entity encodes the bit-1 to be '1' if there exists an RU with size greater than 106-tone, or there are two 106-tone RUs. Otherwise, bit-1 is encode to '0'. The network entity can be a base station, or other network entity on the controllers.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
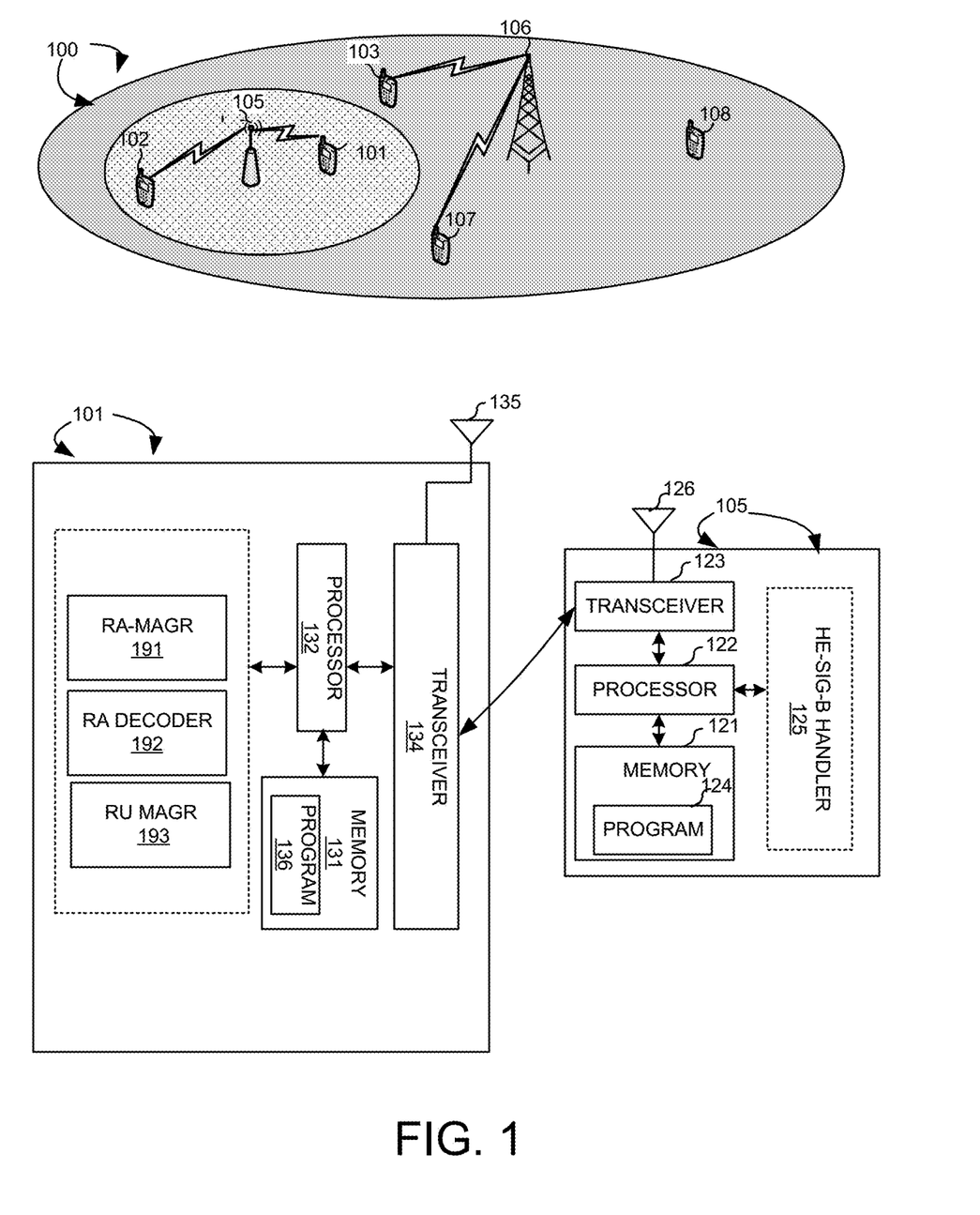
FIG. 1 illustrates an exemplary wireless communication network 100 with station (STA) supports 802.11ax in accordance with embodiments of the current invention.

FIG. 1 illustrates an exemplary wireless communication network 100 with station (STA) supports IEEE 802.11ax standard in accordance with embodiments of the current invention. Wireless communications system 100 includes one or more wireless networks, and each of the wireless communication networks has fixed base infrastructure units, such as wireless communications base stations 105 and 106. The base station may also be referred to as an access point, an access terminal, a base station, a station operating in a software access point mode, or by other terminology used in the art. Each of the wireless communications base stations 105 and 106 serves a geographic area. The geographic area served by wireless communications base stations 105 and 106 overlaps.

Wireless mobile stations or stations (STAs) 101 and 102 in the wireless network 100 are served by base station 105. STA 101, 102 and base station 105 support IEEE 802.11ax standard. Other wireless communications device, such as wireless communication devices 103, 107 and 108, are served by a different base station 106. Base station 106 may support different wireless standards such as LTE, or may also support 802.11ax. STA 101 and 102 send uplink data to base stations 105 and 106 via uplink channels in the time and/or frequency domain. STA 101 and 102 receive downlink data from base stations 105 and 106 via downlink channels.

In one embodiment, the communication system utilizes Orthogonal Frequency Division Multiplexing Access (OFDMA). Wireless network 100 also supports MU-MIMO. The radio resources are portioned into resource blocks for multiple users.

FIG. 1 further shows simplified block diagrams of wireless stations 101 and base station 105 in accordance with the current invention.

Base station 105 has an antenna 126, which transmits and receives radio signals. A RF transceiver module 123, coupled with the antenna, receives RF signals from antenna 126, converts them to baseband signals and sends them to processor 122. Please note the antenna here can refer to one single antenna or a set of multiple antennas. RF transceiver 123 also converts received baseband signals from processor 122, converts them to RF signals, and sends out to antenna 126. Processor 122 processes the received baseband signals and invokes different functional modules to perform features in base station 105. Memory 121 stores program instructions and data 124 to control the operations of base station 105. Base station 105 also includes a set of control modules, such as HE-SIG-B handler 125, which carries out functional tasks for HE-SIG-B functions and communicates with the STA 101 for resource allocation related tasks.

STA 101 has an antenna 135, which transmits and receives radio signals. Please note that the antennae here can refer to one single antenna or a set of multiple antennas. An RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. The processor 132 processes the received baseband signals and invokes different functional modules to perform features in mobile station 101. A memory 131 stores program instructions and data 136 to control the operations of mobile station 101. STA 101 also includes a set of control modules that carry out functional tasks. A resource allocation (RA) manager circuit 191 obtains RA information, wherein the RA information is indicated in a HE-SIG-B common field and user specific field, and wherein the HE-SIG-B common field for RA is with a fixed format. A RA decoder 192 decodes an 8-bit RU allocation signal in the HE-SIG-B common field following a structured resource unit (RU) allocation rule, wherein the structured RU allocation rule supports more than four users on a 106-tone larger RU using the 8-bit structured RU allocation signal. A RU manager circuit 193 determines a RU for the STA based on the decoded 8-bit RU allocation signal and a position of the user specific field for the STA.

Figure 2:
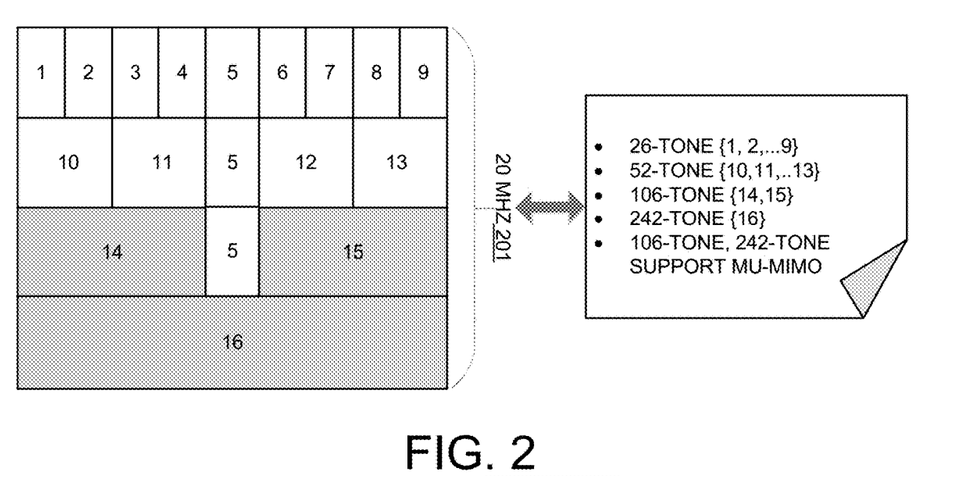
FIG. 2 shows an exemplary diagram of resource unit partition in the 802.11ax system in accordance with embodiments of the current invention.

FIG. 2 shows an exemplary diagram of 20 MHz resource unit partition in the 802.11ax system in accordance with embodiments of the current invention. In one embodiment, the resource allocation is based on the operational bandwidth as configured/defined as shown. A 20 MHz partition block diagram 201 shows the resource unit allocation for the 20 MHz bandwidth. The 20 MHz can be partitioned into nine 26-tone resource units, five 52-tone resource units, two 106-tone resource units and a 52-tone mid-tone unit, and one 242-tone unit. In one embodiment, a structured signaling is used to allocate the 8-bit field for each 20 MHz resource allocation. In the 20 MHz block, the 106-tone and 242-tone supports MU-MIMO. Therefore, for each of the 106-tone and 242-tone allocated, a number of user allocated for the resource needs to be included in the 8-bits. One problem with the traditional 8-bit-allocation design, only two bits are left to indicate the number of MU-MIMO users, leaving a maximum of four users supported. In one embodiment, the first 2-bits of the 8-bit RU allocation field are used to define the RU allocation into different categories, giving three bits of allocation to indicate the number of MU-MIMO users, providing up to eight users.

Figure 3:
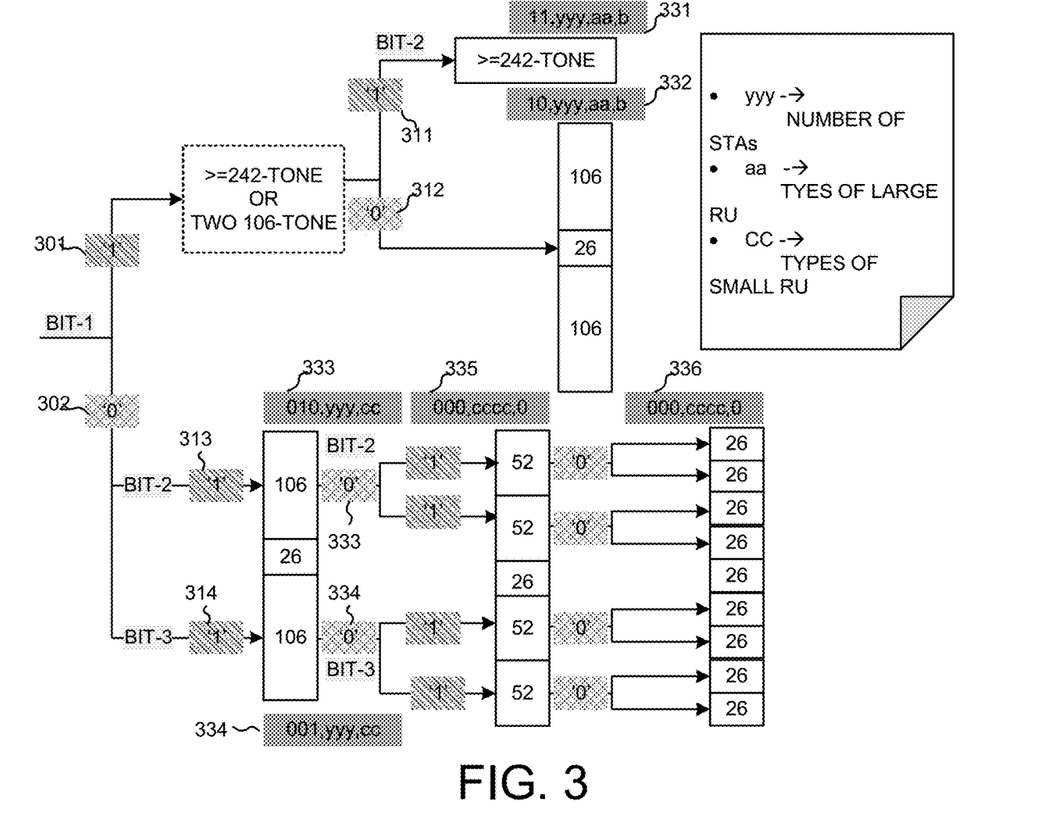
FIG. 3 illustrates an exemplary diagram of the structured 8-bit RU allocation in accordance with embodiments of the current invention.

FIG. 3 illustrates an exemplary diagram of the structured 8-bit RU allocation in accordance with embodiments of the current invention. In one novel aspect, the structured signaling is used. The 8-bit is designed according to predefined rules and the network encodes accordingly while the UEs decodes accordingly as well. It reduces the complexity of a lookup table, saving memory spaces, and improves efficiency. In one embodiment, bit-1 is designed to differentiate large RU and small RU. If at step 301, bit-1 is set to be '1', it indicates there exists 242-tone and larger RUs, or there exist two 106-tone. If bit-1, at step 302, is set to be '0', it indicates there is no large RU. For the large RU case, bit-2 is set to be '1' at step 311 to indicate there exists RUs larger than or equals to 242-tone. In another case large RU case, bit-2 is set to be '0' at step 312 indicating two 106-tone configuration. Once the first two bits are decoded indicating a large RU type, two branches of decoding format is determined. At 331, the '11' case, the 8-bit RU signaling has the format of '11,yyy,aa,b'. At 332, the 8-bit RU signaling has the format of '10,yyy,aa,b'. In both scenarios, yyy is a 3-bit field indicating the number of users. 'aa' is a 2-bit field indicating the types of large RU. In one embodiment, the 'aa' is encoded following the predefined rule as: 242-RU (00), 484-RU (10), 996-RU (01), or 2*996-RU(11).

Following the same decoding rule, for the small-sized RU branch with bit-1 being '0' is further decoded by looking at bit-2 and bit-3. At steps 313 bit-2 is set to be '1', indicating the first part of RU having a 106-tone RU. At step 314, bit-3 is set to be '1', indicating the second part of the RU having a 106-tone RU. As a result, the format of the 8-bit RU signaling has a format determined to be '010,yyy,cc' at step 333 following step 313. The format of the 8-bit RU signaling has a format determined to be '001,yyy,cc' at step 334 following step 314. The 'yyy' indicates the number of users in the 106-tone resource of the first and the second part of the RU for 333 and 334, respectively. The 'cc' indicates the type of smaller-than-106 RU in the second part and the first part of the Ru for 333 and 334, respectively. In one embodiment, the 'cc' is defined as follows: '11': two 52-tone RU; '10': {52, 26 26} tone RU; '01': {26 26 52} tone RU; '00': four 26 tone RUs. Further, formats 335 and 336 are defined as: "000,cccc,0'. 'cccc' defines whether the two pairs are 52-tone or 26-tone. For example, at 335, with all 52-tone RUs, the format is '000,1111,0'. Similarly for the all 26-tone RUs the format is '000,0000,0'. In one novel aspect, more than four users are supported using the 3-bit field for the number of users of MU-MIMO. '011xxxxx' '000xxxx1' and '11xxxxx1' are reserved indices.

Figure 4:
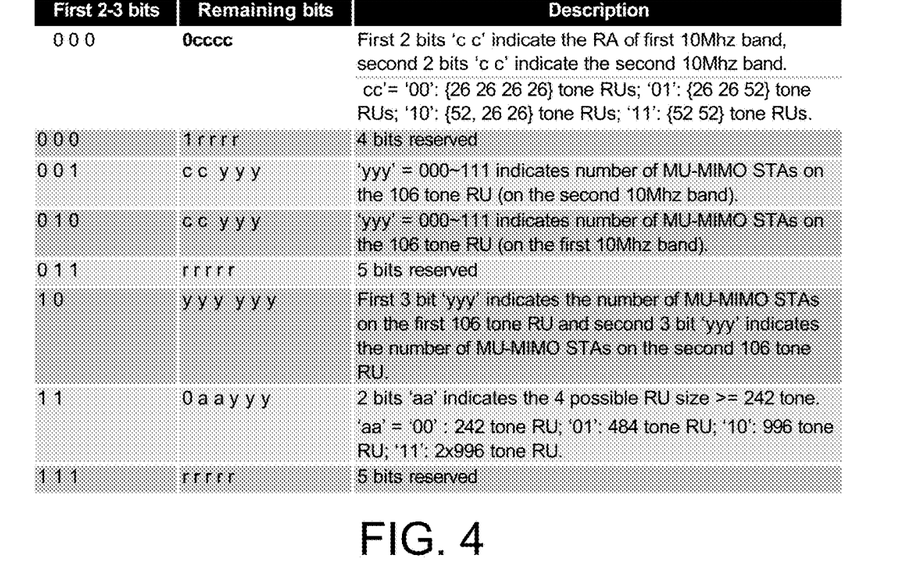
FIG. 4 shows an exemplary table of the 8-bit format using the structured RA signaling in accordance with embodiments of the current invention.

FIG. 4 shows an exemplary table of the 8-bit format using the structured RA signaling in accordance with embodiments of the current invention. The first column is the value of the first 2-bit or 3-bit of the 8-bit signaling bits. The second column is the format for the remaining bits—remaining 6-bit for the first 2-bit, or remaining 5-bit for the first 3-bit. The third column is the description. There are eight type of configurations, '000,0cccc', '000,1rrrr', '001, cc,yyy', '010,cc,yyy', '011,rrrrr', '10,yyy,yyy' '11,0aa,yyy', and '111,rrrrr'. The three-bit 'yyy' field indicates the number of STAs following the format. 'cc' is the type field used by the network and the UE. 'aa' is the type field for larger-than-242 issues. In one embodiment, the first two bits and the first three bits are used to indicate the type of the format. The remaining bits are decoded accordingly. The table and definitions shown here are the preferred configurations.

Figure 5:
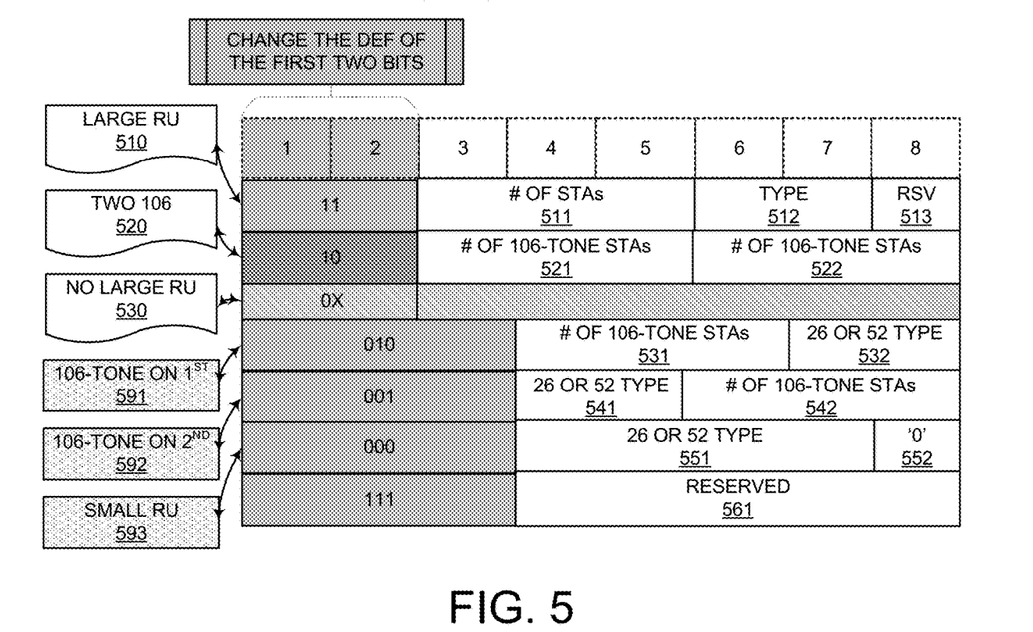
FIG. 5 shows an exemplary diagram of categorizing the 8-bit RU allocation signaling with the first two bits in accordance with embodiments of the current invention.

FIG. 5 shows an exemplary diagram of categorizing the 8-bit RU allocation signaling with the first two bits in accordance with embodiments of the current invention. In one novel aspect, two bits are used to categorize the 8-bit RU allocation-signaling field enabling the signaling supports up to eight users for MU-MIMO instead of four users. If the first two bits are '11', the RU allocation field is categorized as a large RU 510. If the first two bits are '10', the RU allocation field is categorized as a two-106-tone 520. If the first two bits are '0x', including '01' and '00' the RU allocation field is categorized as a no large RU 530. Following the three category definition, the 8-bit RU allocation field is defined accordingly. In one embodiment, category 530 is further categorized into the second category. A three-bit second category identifier is used. The second category identifier includes the two bits for the first category and an additional bit. A category 591 is represented as '010' indicating a 106-tone RU is on the first half of the channel. A category 592 is represented as '001' indicating a 106-tone RU is on the second half of the channel. A category 593 is represented as '000' representing only small RUs, the 52-tone RU and the 26-tone RU, are presented.

For category 520, it includes a 3-bit number of STAs field 511, a 2-bit type of RU field 512 and a reserved bit 513. For category 520, it includes a 3-bit number of 106-tone STAs on the first part of the RU in field 521, and a 3-bit number of 106-tone STAs on the second part of the RU in field 522.

for category 530, a '010' configures the remaining field to include a 3-bit number of 106-tone STAs on the type of RU in the first part of the RU. A '001' configures the remaining field to include a 2-bit type field indicating whether it is 106-tone or real small items, and a 3-bit number of 106-tone STAs on the type of RU in the second part of the RU. A '000' configures a 4-bit field indicating whether it is a 26-tone or a 52-tone type. A '111' indicates the last five bits are reserved.

Figure 6:
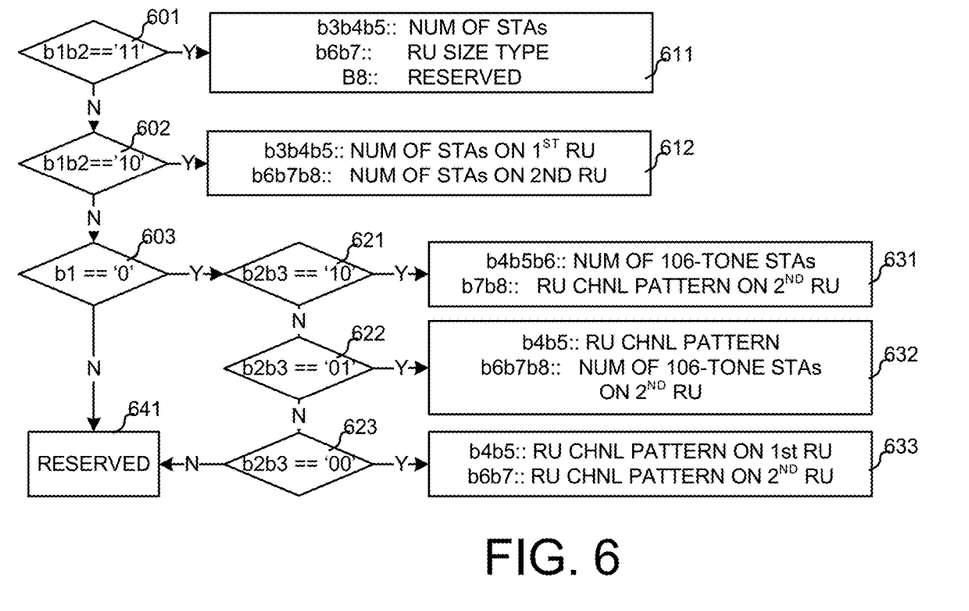
FIG. 6 shows an exemplary flow chart of UE/receiver behavior in decoding the 8-bit RU allocation signaling in accordance with embodiments of the current invention.

FIG. 6 shows an exemplary flow chart of UE/receiver behavior in decoding the 8-bit RU allocation signaling in accordance with embodiments of the current invention. In one embodiment, the receiver of the 8-bit RU allocation signal follows a predefine rule to decode the meaning of signal to determine the resource allocation without using a LUT. The receiver, normally the UE side, checks each bit and interpret the meaning of the following based on the setting of the prior bit based on the predefined rules. The receiver start with bit-1, denoted as b1 and moves forward. In one novel aspect, the first two bits (b1b2) of the 8-bit RU allocation signal field is group together to categorize the RU allocation signal.

At step 601, the receiver checks if bit-1 bit-2 (b1b2)=='11'. If step 601 finds yes, the receiver moves to 611 and set b3b4b5 to the number of STAs, b6b7 to the type of RU size, and b8 is reversed. If step 601 finds no, the receiver moves to 602. At step 602, the receiver determines if b1b1=='10'. If step 602 determines yes, the receiver moves to 612 and sets b3b4b5 to the number of STAs on the first part of RU, and sets b3b4b5 to the number of STAs on the second part of RU. If Step 602 determines no, the receiver moves to step 603.

At step 603, the receiver determines if b1=='0'. If step 603 determines no, the receiver moves to step 641 and treats the remaining bits as reserves. If step 603 determines yes, the receiver moves to step 621. At step 621, the receiver determines if b2b3=='10'. If step 621 determines yes, the receiver moves to step 631 and sets b4b5b6 to indicate the number of 106-tone STAs and b7b8 to indicate the channel pattern of the second part of the RU. In one embodiment, b7b8 is defined as follows: '11': two 52-tone RU; '10': {52, 26 26} tone RU; '01': {26 26 52} tone RU; '00': four 26 tone RUs. If step 621 determines no, the receiver moves step 622.

At step 622, the receiver determines if b2b3=='01'. If step 622 determines yes, the receiver moves to step 632 and sets b4b5 to indicate the channel pattern of the first part of the RU and b6b7b8 to indicate the number of 106-tone STAs. In one embodiment, b4b5 is defined as follows: '11': two 52-tone RU; '10': {52, 26 26} tone RU; '01': {26 26 52} tone RU; '00': four 26 tone RUs. If step 622 determines no, the receiver moves to step 623.

At step 623, the receiver determines if b2b3=='00'. If step 623 determines yes, the receiver moves step 633 and sets b4b5 to indicate the channel pattern of the first part of the RU and b6b7 to indicate the channel pattern of the second part of the RU. In one embodiment, b4b5 and b6b7 are defined as follows: '11': two 52-tone RU; '10': {52, 26 26} tone RU; '01': {26 26 52} tone RU; '00': four 26 tone RUs. If step 623 determines no, the receiver moves to step 641 and treats the remaining bits as reserves.

Figure 7:
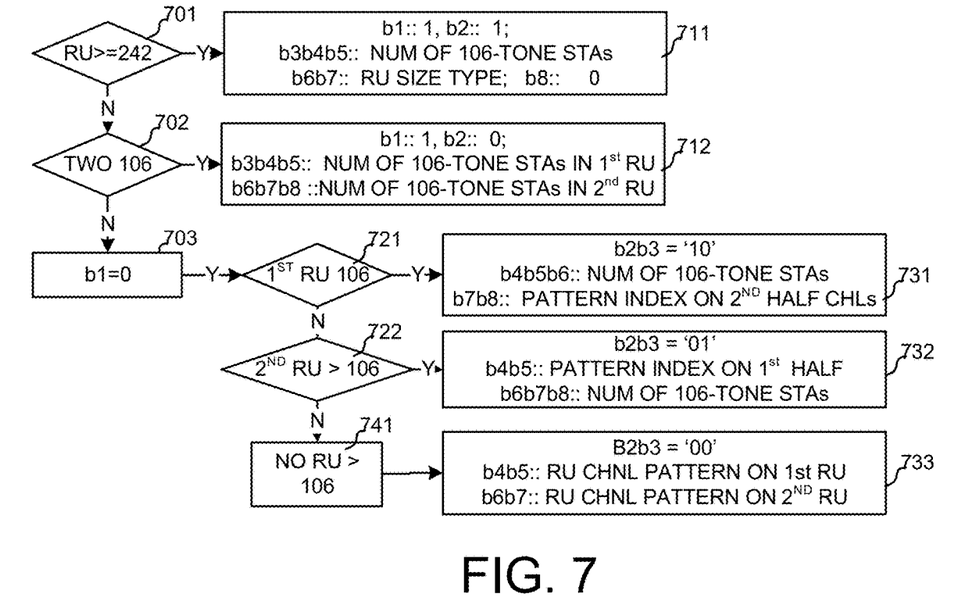
FIG. 7 shows an exemplary flow chart of transmitter behavior in encoding the 8-bit RU allocation signaling in accordance with embodiments of the current invention.

FIG. 7 shows an exemplary flow chart of transmitter behavior in encoding the 8-bit RU allocation signaling in accordance with embodiments of the current invention. In one embodiment, the transmitter, such as the eNB or a network entity, encodes the 8-bit RU allocation signal field based on the sizes of the RUs following predefined rules. At step 701, the transmitter determines if there exists RU larger than or equals to 242-tone. If step 701 determines yes, the transmitter moves to step 711 and sets b1=1, b2=1, b3b4b5 to indicate the number of 106-tone STAs, b6b7 to indicate the type of RU, and b8=0. In one embodiment, the b6b7 is defined as follows: 242-RU (00), 484-RU (10), 996-RU (01), or 2*996-RU(11). If step 701 determines no, the transmitter moves to step 702.

At step 702, the transmitter determines if there are two 106-tone RUs. If step 702 determines yes, the transmitter moves to step 712 and sets b1=1, b2=0, b3b4b5 to indicate the number of 106-tone STAs in the first part, and b6b7b8 to indicate the number of 106-tone STAs in the second part. If step 702 determines no, the transmitter moves to step 703 and sets b1=0. After setting b1=0 at step 703, the transmitter moves to step 721.

At step 721, the transmitter determines if there is 106-tone in the first part. If step 721 determines yes, the transmitter moves to step 731 and sets b2b3='10', b4b5b6 to indicate the number 106-tone STAs, and b7b8 to indicate the pattern of the second part of the channel. In one embodiment, b7b8 is defined as follows: '11': two 52-tone RU; '10': {52, 26 26} tone RU; '01': {26 26 52} tone RU; '00': four 26 tone RUs. If step 721 determines no, the transmitter moves to step 722. At step 722, the transmitter determines if there is 106-tone in the second part.

If step 722 determines yes, the transmitter moves to step 732 and sets b2b3='01', b4b5 indicate the pattern index on the first half of the channel, and b6b7b8 to indicate the number 106-tone STAs. In one embodiment, b4b5 is defined as follows: '11': two 52-tone RU; '10': {52, 26 26} tone RU; '01': {26 26 52} tone RU; '00': four 26 tone RUs. If step 722 determines no, the transmitter determines at step 741 there is no RU greater than 106-tone and moves to step 733. At step 733, the transmitter sets b2b3='00', and b4b5 to indicate the RU channel pattern index on the first half of the channel, and b6b7 to indicate the RU channel pattern index on the second half of the channel. In one embodiment, b4b5 and b6b7 are defined as follows: '11': two 52-tone RU; '10': {52, 26 26} tone RU; '01': {26 26 52} tone RU; '00': four 26 tone RUs.

It is understood by one of ordinary skill in the art that the notation such as the bit-1, b1, b1b2, b4b5b6 are relative positions in the 8-bit field. Other common representations, such as label the 8-bit field from b7b6b5b4b3b2b1b0 can be used to replace the representation in the above figures. Further, in other embodiments, bit-1 may be encoded in the position of b7 in the representation of b7b6b5b4b3b2b1b0. Similarly, b8 or bit-8 may be encoded in the position b0 in the representation of b7b6b5b4b3b2b1b0.

In one novel aspect, RU allocation lookup table can be build based on the structure rule. The LUT can be built and statically stored or dynamically generated based on the rule. The UE can determine the resource allocation based on the structured signal rule, or by searching the LUT built based on the rule. Alternatively, the UE can also obtain the RU allocation information using a combination of the LUT and the structured signal rule.

Figure 8:
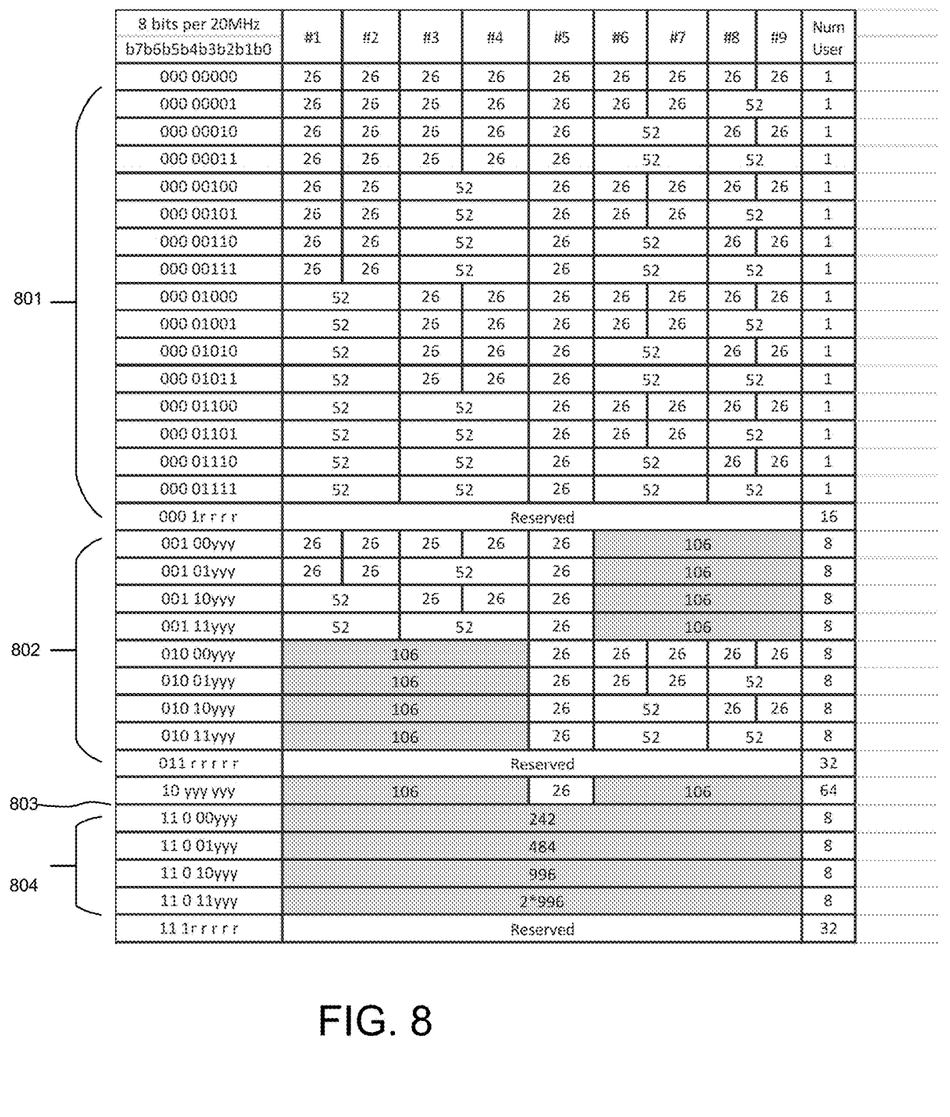
FIG. 8 shows an exemplary LUT built based on the structure signal rule in accordance with embodiments of the current invention.

FIG. 8 shows an exemplary LUT built based on the structure signal rule in accordance with embodiments of the current invention. The first column shows the 8-bit layout. The bit sequence is b7b6b5b4b3b2b1b0. The next nine columns show the corresponding RUs in the corresponding positions. The last column shows the possible number of users supported for each 8-bit pattern. The MU-MIMO is supported for RUs with size greater than or equal to 106-tone. 0001rrrr, 011rrrrr, and 111rrr are reserved and can be used to carry other information. Following the structure signaling rules, the LUT can be categorized. Rows 801 include the configurations that support OFDMA only. Rows 802 support OFDMA plus MU-MIMO with one RU supporting MU-MIMO. Row 803 is the OFDMA plus MU-MIMO with two RUs supporting MU-MIMO. Rows 804 are large RUs.

Figure 9:
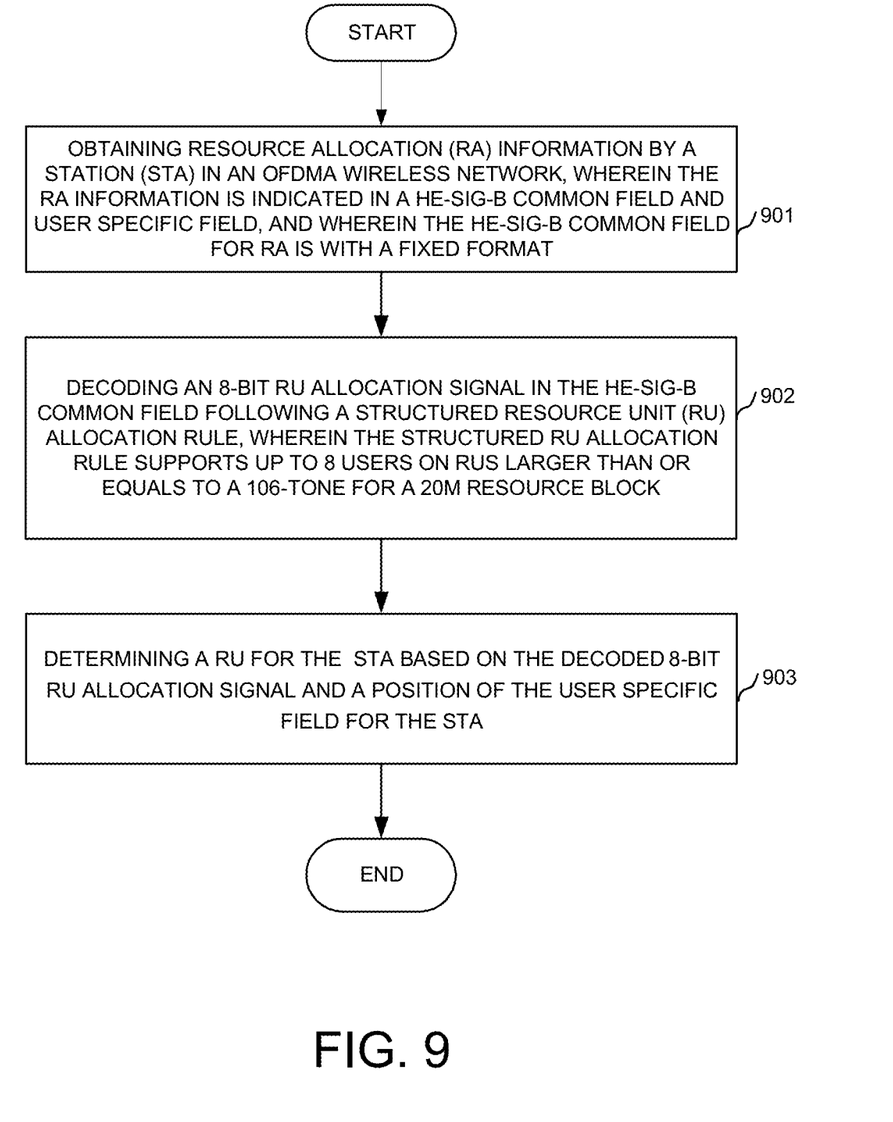
FIG. 9 illustrates an exemplary flow chart for the STA to perform the structured resource allocation signaling in accordance with embodiments of the current invention.

FIG. 9 illustrates an exemplary flow chart for the STA to perform the structured resource allocation signaling in accordance with embodiments of the current invention. At step 901, the STA obtains resource allocation (RA) information in an OFDMA wireless network, wherein the RA information is indicated in a HE-SIG-B common field and user specific field, and wherein the HE-SIG-B common field for RA is with a fixed format. At step 902, the STA decodes an 8-bit RU allocation signal in the HE-SIG-B common field following a structured resource unit (RU) allocation rule, wherein the structured RU allocation rule supports up to 8 users on RUs larger than or equals to 106-tone. At step 903, a RU for the STA based on the decoded 8-bit RU allocation signal and a position of the user specific field for the STA.

Figure 10:
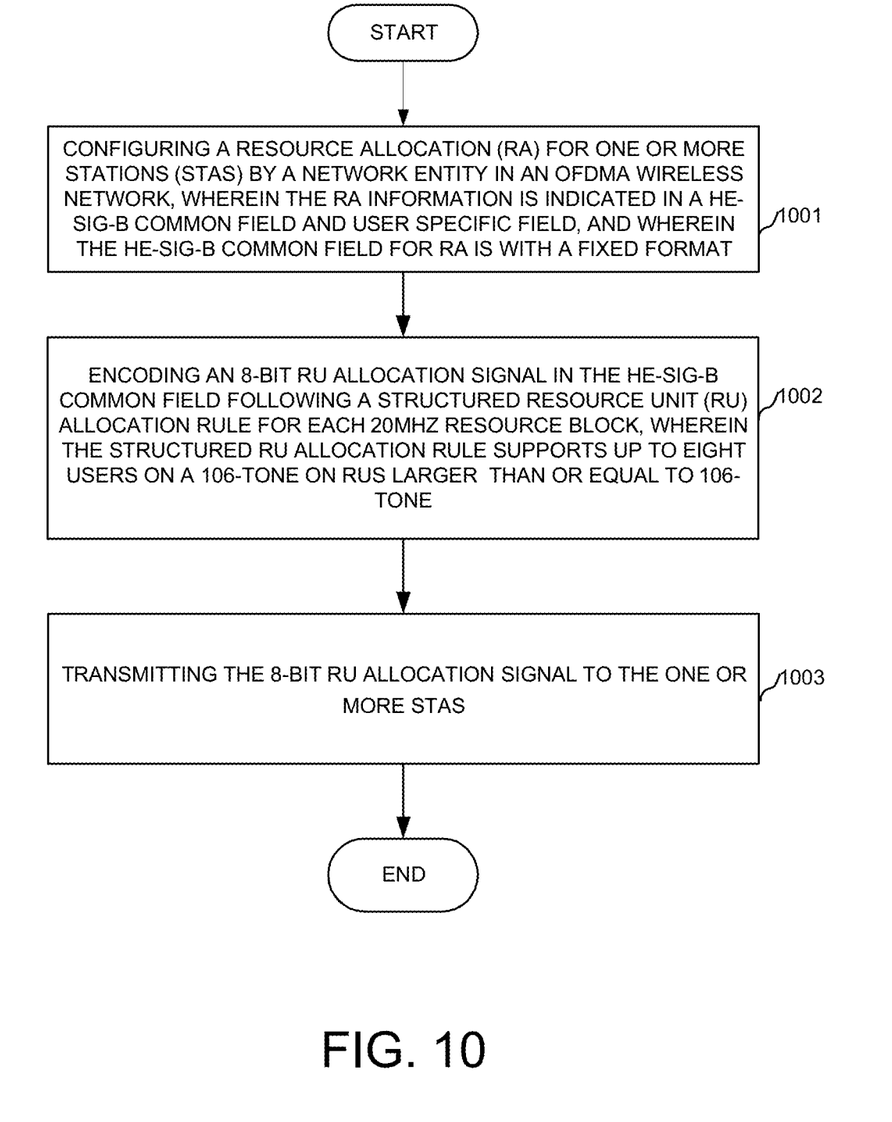
FIG. 10 illustrates an exemplary flow chart for the network entity to perform the structured resource allocation signaling in accordance with embodiments of the current invention.

FIG. 10 illustrates an exemplary flow chart for the network entity to perform the structured resource allocation signaling in accordance with embodiments of the current invention. At step 1001, the network entity configures a resource allocation (RA) for one or more STAs in an OFDMA wireless network, wherein the RA information is indicated in a HE-SIG-B common field and user specific field, and wherein the HE-SIG-B common field for RA is with a fixed format. At step 1002, the network entity encodes an 8-bit RU allocation signal in the HE-SIG-B common field following a structured resource unit (RU) allocation rule for each 20 MHz resource block, wherein the structured RU allocation rule supports up to eight users on a 106-tone on RUs larger than or equal to 106-tone. At step 1003, the network entity transmits the 8-bit RU allocation signal to the one or more STAs.

Although the present invention has been described in connection with certain specific embodiments for instructional purposes, the present invention is not limited thereto. For example, although an LTE-advanced mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:
1. A method, comprising:
obtaining resource allocation (RA) information by a station (STA) in an orthogonal frequency division multiple access (OFDMA) wireless network, wherein the

RA information is indicated in an HE-SIG-B common field and a user specific field, and wherein the HE-SIG-B common field is of a fixed format;

decoding an 8-bit RU allocation signal in the HE-SIG-B common field following a structured resource unit (RU) allocation rule to produce a decoded 8 bit RU allocation signal; and determining an RU allocation for the STA based on the decoded 8-bit RU allocation signal and a position of the user specific field for the STA, wherein two bits of the 8-bit RU allocation signal are used as a first category identifier to determine a first category of the RU allocation, wherein the first category is assigned to a no-large-RU category, wherein a three-bit second category identifier is used to further categorize the no-large-RU category into a second category including a 106-tone on a 1st half channel, a 106-tone on a 2nd half channel, and wherein the three-bit second category identifier includes two bits for the first category identifier bits.

2. The method of claim 1, wherein the first category of the RU allocation comprises: a large size RU category indicating that greater than or equal to 242-tone RUs exist; a two 106-tone category indicating that two 106-tone RUs exist; and a no-large-RU category indicating that only less-than-242-tone RUs exist and no more than one 106-tone RU exists.

3. The method of claim 2, wherein the first category is assigned the large size RU, and wherein two bits are encoded to indicate the RU size and three bits are encoded to indicate a number of STAs scheduled on the RU.

4. The method of claim 2, wherein the first category is assigned the two 106-tone category, and wherein a first 3-bits represent a number of STAs on a first 106-tone RU, and a second 3-bits represent a number of STAs on a second 106-tone RU.

5. The method of claim 2, wherein the three-bit second category identifier is used to further categorize the no-large-RU category into a second category including a small RU.

6. The method of claim 5, wherein a second bit in the second category identifier represents whether a 106-tone RU exists on a first half of a 20 MHz channel and a third bit in the second category identifier represents whether a 106-tone RU exists on a second half of the 20 MHz channel.

7. The method of claim 5, wherein a three-bit identifier represents a number of STAs on a 106-tone RU if one of the second and third bits indicates a 106-tone RU, and wherein a two-bit identifier represents one of four RU allocations, comprising: a four 26-tone RU, a one 52-tone RU and a two 26-tone RU; two 26-tone RUs and one 52-tone RU; and two 52-tone RUs, on a half of the 20 MHz channel where no 106-tone RU exists.

8. The method of claim 1, wherein the determining an RU allocation comprises:

obtaining a lookup table (LUT) for RU allocation based on the structured RU allocation rule; and determining the RU allocation based on the LUT and the position of user specific field.

9. A method, comprising:

configuring a resource allocation (RA) for one or more stations (STAs) by a network entity in an OFDMA wireless network, wherein RA information is indicated in an HE-SIG-B common field and a user specific field, and wherein the HE-SIG-B common field is of a fixed format;

encoding an 8-bit RU allocation signal in the HE-SIG-B common field following a structured resource unit (RU) allocation rule for each 20 MHz resource block, wherein the structured RU allocation rule defines a range including between 5 to 8 users on RUs greater than or equal to 106-tone; and transmitting the 8-bit RU allocation signal for receipt by one or more STAs, and wherein two bits of the 8-bit RU allocation signal are encoded to determine a first category of RU allocation, wherein the first category is assigned to a no-large-RU category, wherein a three-bit second category identifier is used to further categorize the no-large-RU category into a second category including a 106-tone on a 1st half channel, a 106-tone on a 2nd half channel, and wherein the three-bit second category identifier includes the two bits for the first category identifier bits.

10. The method of claim 9, wherein bit-1 of the 8-bit RU allocation signal is set to be '1' if there exists an RU size greater than 106-tone or there are two 106-tone RUs, otherwise, bit-1 is set to be '0'.

11. The method of claim 10, wherein an RU size greater than 106-tone is set, and wherein bit-2 is set to be '1', and wherein three bits are encoded to indicate a number of STAs and two bits are encoded to indicate a RU size.

12. The method of claim 10, wherein two 106-tone RUs are set, and wherein bit-2 is set to be '0', and wherein a first 3-bits represent a number of STAs on a first 106-tone RU, and a second 3-bits represents a number of STAs on a second 106-tone RU.

13. The method of claim 10, wherein bit-1 is set to be '0', and wherein bit-2 represents whether a 106-tone RU exists on a first half of a 20 MHz channel and bit-3 represents whether a 106-tone RU exists on a second half of the 20 MHz channel.

14. The method of claim 13, wherein three bits represent a number of STAs on a 106-tone RU if one of the second and third bits indicates a 106-tone RU, and wherein two bits represent one of four RU allocations, comprising: four 26-tone RUs: one 52-tone RU and two 26-tone RUs; two 26-tone RUs and one 52-tone RU; and two 52-tone RUs, on the half of the 20 MHz channel where no 106-tone RU exists.

15. The method of claim 9, further comprising:

generating a lookup table (LUT) for RU allocation based on the structured RU allocation rule.

16. A station (STA), comprising:

a radio frequency (RF) transceiver operable to transmit and receive wireless signals in an orthogonal frequency division multiple access (OFDMA) wireless network;

a resource allocation (RA) manager circuit that obtains RA information, wherein the RA information is indicated in an HE-SIG-B common field and a user specific field, and wherein the HE-SIG-B common field is of a fixed format;

an RA decoder operable to decode an 8-bit RU allocation signal in the HE-SIG-B common field following a structured resource unit (RU) allocation rule, wherein the structured RU allocation rule defines a range including between 5 to 8 users on RUs greater than or equal to 106-tone; and an RU manager circuit operable to determine an RU allocation for the STA based on the decoded 8-bit RU allocation signal and a position of the user specific field for the STA, and wherein two bits of the 8-bit RU allocation signal are used as a first category identifier to determine a first category of the RU allocation, wherein the first category is set to the no-large-RU category, and wherein a three-bit second category identifier is used to further categorize the no-large-RU category into a second category including a 106-tone on a 1st half channel, and a 106-tone on a 2nd half channel, wherein the three-bit second category identifier includes the two bits for the first category identifier bits.

17. The STA of claim 16, wherein the first category of the RU allocation comprises: a large size RU category indicating greater than or equal to 242-tone RU exists; a two 106-tone category indicating two 106-tone RUs exist; and a no-large-RU category indicating only smaller-than-242-tone RUs exist and no more than one 106-tone exists.

18. The STA of claim 16, wherein the first category is set to the large size RU category, and wherein two bits are encoded to indicate the RU size and three bits are encoded to indicate a number of STAs scheduled on the RU.

19. The STA of claim 16, wherein the first category is set to the two 106-tone category, and wherein a first 3-bits represent a number of STAs on a first 106-tone RU, and a second 3-bits represent a number of STAs on a second 106-tone RU.

* * * * *